United States Patent
Kawamoto et al.

(10) Patent No.: US 6,882,475 B2
(45) Date of Patent: Apr. 19, 2005

(54) POLARIZING MEMBER, ILLUMINATOR AND LIQUID-CRYSTAL DISPLAY DEVICE

(75) Inventors: Ikuo Kawamoto, Ibaraki (JP); Hironori Motomura, Ibaraki (JP); Miki Shiraogawa, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/067,505

(22) Filed: Feb. 7, 2002

(65) Prior Publication Data
US 2003/0086169 A1 May 8, 2003

(30) Foreign Application Priority Data

Nov. 6, 2000 (JP) ..................... P2000-337730

(51) Int. Cl.[7] .............................................. G02B 27/28
(52) U.S. Cl. .................. 359/487; 359/350; 359/352; 359/485
(58) Field of Search .................. 359/485, 490, 359/491, 502, 487, 488, 350, 352; 349/96, 97

(56) References Cited

U.S. PATENT DOCUMENTS

| | | | | |
|---|---|---|---|---|
| 5,170,194 A | * | 12/1992 | Kurematsu et al. | 353/52 |
| 5,999,243 A | | 12/1999 | Kameyama et al. | 349/185 |
| 6,169,708 B1 | * | 1/2001 | Kaneko et al. | 368/84 |
| 6,342,934 B1 | * | 1/2002 | Kameyama et al. | 349/98 |
| 6,404,469 B1 | * | 6/2002 | Kitagawa et al. | 349/96 |
| 6,490,017 B1 | * | 12/2002 | Huang et al. | 349/97 |
| 6,543,153 B1 | * | 4/2003 | Weber et al. | 34/96 |

FOREIGN PATENT DOCUMENTS

| | | |
|---|---|---|
| JP | 4-268505 | 9/1992 |
| JP | 10-319235 | 12/1998 |
| JP | 11-311710 | 11/1999 |
| JP | 2001-154021 | 6/2001 |
| JP | 2001-166140 | 6/2001 |
| WO | WO 95/17691 | 6/1995 |

* cited by examiner

*Primary Examiner*—Drew A. Dunn
*Assistant Examiner*—Joshua L Pritchett
(74) *Attorney, Agent, or Firm*—Westerman, Hattori Daniels & Adrian LLP

(57) ABSTRACT

There is provided a polarizing member having a sheet-like member formed so that linearly polarized light can be obtained as transmitted light through the sheet-like member after natural light is incident on a rear surface of the sheet-like member, wherein the sheet-like member exhibits a transmittance difference of not larger than 6% between transmitted light components within a 20 nm-wide wavelength region in a transmission spectrum of light in a wavelength range of from 520 to 640 nm when natural light is incident on the sheet-like member at any angle ranging from an angle viewing from a line normal to a surface of the sheet-like member to an elevation angle of 80 degrees. There is provided an illuminator having a planar light source including a reflection layer on a rear surface side of the planar light source, and a polarizing member defined above and disposed on a front surface side of the planar light source. There is also provided a liquid-crystal display device having an illuminator defined above, and a liquid-crystal cell disposed on a light exit side of the illuminator through the polarizing member of the illuminator.

12 Claims, 1 Drawing Sheet

POLARIZING MEMBER, ILLUMINATOR AND LIQUID-CRYSTAL DISPLAY DEVICE

The present application is based on Japanese Patent Application No. 2000-337730, which is incorporated herein by reference.

BACKGROUND OF THE INVENTION

1. Field of the Invention

The present invention relates to a polarizing member for use in forming an illuminator or a liquid-crystal display device which is hardly discolored at a wide viewing angle including a frontally viewing direction and an obliquely viewing direction.

2. Description of the Related Art

Various kinds of techniques have been heretofore known as techniques each using a reflective type polarizer to prevent discoloration in order to make luminance of a liquid-crystal display device high (Unexamined Japanese Patent Publication No. Hei. 4-268505, WO 95/17691, Unexamined Japanese Patent Publication No. Hei. 10-319235, and Unexamined Japanese Patent Publication No. Hei. 11-311710). On the other hand, there have been related-art proposals for preventing discoloration by addition of a light-diffusing layer (Unexamined Japanese Patent Publications No. 2001-154021 and 2001-166140). There is, however, a problem that luminance is lowered because of shortage of improvement in discoloration and elimination of polarization in an obliquely viewing direction.

Particularly in the technique of reducing the quantity of the change of chromaticity in hue between a frontally viewing direction and an obliquely viewing direction as suggested in Unexamined Japanese Patent Publication No. Hei. 10-319235, there is a problem that change of an elevation angle makes chromaticity be changed larger when the direction of discoloration varies in accordance with the elevation angle in oblique viewing. There is also a problem in rainbow-coloring such that a remarkable change of the view angle occurs in spite of a very small change of the elevation angle. On the contrary, when the quantity of the change of chromaticity between elevation angles is small in spite of a large quantity of the change of chromaticity in the frontal viewing direction, visibility is good. Hence, the necessity of performing evaluation by eye observation still remains in the technique. Accordingly, there is a disadvantage in that accurate evaluation cannot be achieved on the basis of comparison between hue at a frontal viewing angle and hue at an optional elevation angle by an apparatus.

SUMMARY OF THE INVENTION

An object of the invention is to develop a polarizing member for use in forming an illuminator or a liquid-crystal display device which is hardly discolored at a wide viewing angle including a frontally viewing direction and an obliquely viewing direction.

According to the invention, there is provided a polarizing member having a sheet-like member formed so that linearly polarized light can be obtained as transmitted light through the sheet-like member after natural light is incident on a rear surface of the sheet-like member, wherein the sheet-like member exhibits a transmittance difference of not larger than 6% between transmitted light components within a 20 nm-wide wavelength region in a transmission spectrum of light in a wavelength range of from 520 to 640 nm when natural light is incident on the sheet-like member at any angle ranging from an angle viewing from a line normal to a surface of the sheet-like member to an elevation angle of 80 degrees. Further, there is provided an illuminator having a planar light source including a reflection layer on a rear surface side of the planar light source, and a polarizing member defined above and disposed on a front surface side of the planar light source. In addition, there is provided a liquid-crystal display device having an illuminator defined above, and a liquid-crystal cell disposed on a light exit side of the illuminator through the polarizing member of the illuminator.

According to the invention, there can be obtained a polarizing member capable of suppressing such rainbow-coloring that hue varies rapidly in accordance with the change of an evaluation angle. The polarizing member can be used for forming an illuminator or a liquid-crystal display device which is hardly discolored at a wide viewing angle including a frontally viewing direction and an obliquely viewing direction. Further, the polarizing member may be used in combination with a reflective type polarizer to achieve high luminance. This is based on the fact that the transmission spectral characteristic has been found under investigation into the problem of rainbow-coloring. That is, the problem of rainbow-coloring is caused by bright-line emission in a spectrum of light emitted from a light source. The problem of interference fringes is not generated when a broad light source without bright-line emission is used. In a normal light source, particularly in a fluorescent lamp, however, one emission-line peak or two or more emission-line peaks appear in the spectrum of light from the light source as shown in FIG. 2.

Incidentally, in FIG. 2, emission-line peaks appear in a wavelength range of from about 520 to about 560 nm and in a wavelength range of from about 600 to about 640 nm whereas relatively broad emission characteristic is exhibited in the other wavelength ranges. On this occasion, transmittance varies widely in a spectrum in a wavelength range of from about 520 to 640 nm on the basis of a phenomenon that a transmission spectrum shifts to the short wavelength side when the elevation angle is changed from the frontally viewing direction to an obliquely viewing direction. This changes hue rapidly to bring about interference fringes. Therefore, when the variation in transmittance in the transmission spectrum in the wavelength range described above is suppressed through the polarizing member, generation of interference fringes can be suppressed.

DETAILED DESCRIPTION OF THE PREFERRED EMBODIMENTS

Figure 1:
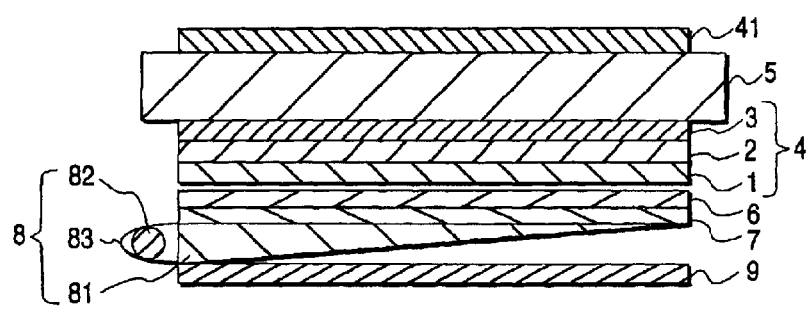
FIG. 1 is a sectional view showing an example of a liquid-crystal display device (polarizing member)

A polarizing member according to the invention has a sheet-like member formed so that linearly polarized light can be obtained as transmitted light through the sheet-like member after natural light is incident on a rear surface of the sheet-like member, wherein the sheet-like member exhibits a transmittance difference of not larger than 6% between transmitted light components within a 20 nm-wide wavelength region in a transmission spectrum of light in a wavelength range of from 520 to 640 nm when natural light is incident on the sheet-like member at any angle ranging from an angle viewing from a line normal to a surface of the sheet-like member to an elevation angle of 80 degrees. FIG. 1 shows an example of the polarizing member. In FIG. 1, there is provided a polarizing member 4. Incidentally, FIG. 1 shows a liquid-crystal display device to which the polarizing member according to the present invention is applied. The liquid-crystal display device includes an absorptive type polarizer 41 and a liquid-crystal cell 5, and a planar light source 8.

As the polarizing member, it is possible to use a sheet-like member in which linearly polarized light can be obtained as transmitted light through the sheet-like member after natural light is incident on a rear surface of the sheet-like member. Hence, a suitable member which can function as a polarizing element may be used as the polarizing member. Incidentally, an example of the sheet-like member is constituted by an absorptive type polarizer or by a laminate of an absorptive type polarizer and a reflective type polarizer which allows linearly polarized light to be transmitted therethrough and provided so that an axis of transmission of linearly polarized light through the reflective type polarizer and an axis of transmission through the absorptive type polarizer are parallel to each other.

As the absorptive type polarizer, any suitable one may be used if the polarizer transmits linearly polarized light but absorbs the other light components when natural light is incident on the polarizer. There is no particular limitation in kind of the absorptive type polarizer. Generally, a polarizing film or a polarizing film having one surface protected by a transparent protective layer or having opposite surfaces protected by transparent protective layers may be used. Alternatively, a material such as a lyotropic liquid-crystal dichromatic dye which forms an aligned thin film to function as a polarizing element when the material is applied onto a transparent base material may be used as the absorptive type polarizer.

Examples of the polarizing film include: a polarizing film obtained by drawing a hydrophilic polymer film such as a polyvinyl alcohol film, a partially formalized polyvinyl alcohol film or a partially saponified ethylene-vinyl acetate copolymer film while making the hydrophilic polymer film adsorb iodine and/or dichromatic dye; and a polyene-oriented film such as a dehydrated polyvinyl alcohol film or a dehydrochlorinated polyvinyl chloride film. The transparent protective layer provided on one or each of opposite surfaces of the polarizing film in accordance with necessity can be made of a suitable transparent polymer. Especially, the transparent protective layer may be preferably made of a polymer excellent in transparency, mechanical strength, thermal stability, and moisture sealability. The transparent protective layer can be formed by a suitable method such as a method of applying a polymer liquid or a method of bonding and laminating a film.

Incidentally, specific examples of the polymer for forming the transparent base material and the transparent protective layer include: cellulose polymers such as cellulose diacetate, and celllulose triacetate; polyester polymers such as polyethylene terephthalate, and polyethylene naphthalate; polycarbonate polymers; acrylic polymers such as polymethyl methacrylate; styrene polymers such as polystyrene, and acrylonitrile-styrene copolymer; olefin polymers such as polyethylene, polypropylene, polyolefin of a cyclo type or norbornene structure, and ethylene-propylene copolymer; vinyl chloride polymers; and amide polymers such as Nylon, and aromatic polyamide.

Examples of the polymer further include: imide polymers; sulfone polymers; polyether-sulfone polymers; polyether-ether-ketone polymers; polyphenylene sulfide polymers; vinyl alcohol polymers; vinylidene chloride polymers; vinyl butyral polymers; allylate polymers; polyoxymethylene polymers; epoxy polymers; blends of these polymers; and polymers curable by heat, ultraviolet-ray irradiation such as a polyester polymer, an acrylic polymer, an urethane polymer, an amide polymer, a silicone polymer, and an epoxy polymer.

A polymer which can form a transparent base material such as a cellulose film excellent in isotropy may be preferably used. The thickness of the transparent base material or the transparent protective layer can be determined suitably in accordance with bearing strength, protecting strength, etc. The thickness is generally selected to be in a range of from 5 to 200 μm, especially in a range of from 10 to 150 μm, further especially in a range of from 20 to 100 μm.

On the other hand, examples of the reflective type polarizer which allows linearly polarized light to be transmitted include: a linearly polarized light separating sheet (such as DBEF made by 3M Company) which is constituted by a multilayer film made of a laminate of thin films for separating incident light into a reflected light component and a transmitted light component of linearly polarized light with vibration planes crossing each other perpendicularly through interfacial reflection in the multilayer film; and a laminate of a circularly polarized light separating sheet which is constituted by a cholesteric liquid-crystal layer aligned in the Grandjean texture for separating incident light into a reflected light component and a transmitted light component of one of left- and right-handed circularly polarized light beams and a quarter-wave plate. Incidentally, FIG. 1 shows a reflective type polarizer constituted by a laminate of a circularly polarized light separating sheet 1 and a quarter-wave plate 2.

The reflective type polarizer uses the polarized light separating function so that the transmitted light component of linearly polarized light obtained from incident light from a light source such as a backlight is supplied to an absorptive type polarizer which is laminated so that the plane of vibration of the transmitted light component is parallel to the axis of transmission of the absorptive type polarizer to thereby reduce absorption loss. As a result, the light quantity allowed to be used in a liquid-crystal display device is increased, so that luminance can be improved. The reflective type polarizer may be also used by the following method. That is, the reflected light component separated by the reflective type polarizer is reversed by a reflection layer and made incident on the reflective type polarizer again. Hence, the light component is partially or wholly transmitted as predetermined linearly polarized light through the absorptive type polarizer. As a result, the light quantity allowed to be used in the liquid-crystal display device is increased more greatly, so that luminance can be improved more greatly.

Hence, the reflective type polarizer (which is a laminate of a circularly polarized light separating sheet 1 and a quarter-wave plate 2) for forming the polarizing member 4 as shown in FIG. 1 is provided to be located between the absorptive type polarizer 3 and the light source 8. Incidentally, when the reflective type polarizer is to be made of the circularly polarized light separating sheet 1 of a cholesteric liquid-crystal layer as shown in FIG. 1, a method using the quarter-wave plate 2 for linearly polarizing circularly polarized light transmitted through the circularly polarized light separating sheet and supplying the linearly polarized light to the absorptive type polarizer 3 is employed in order to obtain a transmitted light component of linearly polarized light.

The circularly polarized light separating sheet can be obtained as a film of a cholesteric liquid-crystal polymer or a cholesteric liquid-crystal layer closely supported by a transparent base material. The cholesteric liquid-crystal layer exhibiting reflecting/transmitting characteristic can be obtained as a liquid-crystal polymer layer aligned in the Grandjean texture through an oriented film subjected to a rubbing treatment on a transparent base material.

As the cholesteric liquid-crystal layer, it is possible to use a suitable one if the cholesteric liquid-crystal layer can exhibits characteristic such that a light component of one of left- and right-handed circularly polarized light beams of the incident light is allowed to be reflected while the other light component of the incident light is allowed to be transmitted. There is no particular limitation in kind of the cholesteric liquid-crystal layer. The circularly polarized light separating sheet may have a structure in which two cholesteric liquid-crystal layers or three or more cholestertic liquid-crystal layers different in reflection wavelength range are superposed on one another in order to obtain circularly polarized light transmitted in a wide wavelength range. Incidentally, any one of base materials listed above may be used as the transparent base material.

As described above, the quarter-wave plate disposed on the circularly polarized light separating sheet is provided for linearly polarizing circularly polarized light to prevent absorption loss to thereby improve luminance in the condition that an absorptive type polarizer is disposed so that the axis of transmission through the absorptive type polarizer is made as coincident with the axis of transmission (the plane of vibration) of the linearly polarized light as possible. As the quarter-wave plate, it is possible to use a suitable one in accordance with the related art. Examples of the suitable quarter-wave plate include: a birefringent film constituted by a drawn film of any kind of polymer; an aligned film of a liquid-crystal polymer such as a discotic polymer or a nematic polymer; and an aligned liquid-crystal layer of such a liquid-crystal polymer supported on a transparent base material.

As the polymer for forming the birefringent film, it is possible to use a suitable one selected from the polymers listed above in the description for the transparent base material. Especially, polymers excellent in crystallinity such as polyester polymers or polyether-ether-ketone polymers may be preferably used. The drawn film may be a film treated by a suitable method such as a uniaxial drawing method or a biaxial drawing method. The birefringent film may have a thickness wise refractive index controlled by a method of giving shrinking force or/and expanding force under adhesion to a heat-shrinkable film.

The quarter-wave plate may be constituted by a laminate of two or more retardation layers in order to control optical characteristic such as retardation. Incidentally, the quarter-wave plate functioning in a wide wavelength range such as a visible light range can be obtained by a method of superposing a retardation layer functioning as a quarter-wave plate to monochromatic light such as light with a wavelength of 550 nm on a retardation layer exhibiting another retardation characteristic, for example, on a retardation layer functioning as a half-wave plate.

The polarizing member according to the invention is provided so that the transmittance difference with respect to transmitted light within a 20 nm-wide wavelength region in a wavelength range of from 520 to 640 nm in a transmission spectrum of light is controlled to be not larger than 6% when natural light is incident on the polarizing member at an optional angle ranging from an angle viewing from a line normal to a surface of the member to an elevation angle of 80 degrees.

The polarizing member having the transmittance characteristic can be obtained as an absorptive type polarizer made of a polyvinyl alcohol polarizing film protectively covered with a triacetyl cellulose film or as a reflective type polarizer made of a laminate of cholesteric liquid-crystal layers.

Respective constituent layers such as an absorptive type polarizer, a reflective type polarizer, etc. for forming the polarizing member may be simply piled up. It is, however, preferable that the respective constituent layers are laminated and integrated with one another through adhesive layers such as tacky layers in order to stabilize quality through prevention of the optical axis from being displaced and in order to improve efficiency in assembling the liquid-crystal display device. An adhesive layer may be provided on the outer surface of the polarizing member as occasion demands in order to bond the polarizing member to another member such as a liquid-crystal cell. When the adhesive layer is a tacky layer and has a surface exposed to the outside, the surface of the polarizing member may be temporarily attached to and covered with a separator for the purpose of protection such as anti-contamination until the adhesive layer is put into practical use.

A suitable transparent adhesive agent can be used for forming the adhesive layer. A tacky layer may be preferably used from the point of view of handling properties. For the formation of the tacky layer, there can be used a suitable tacky substance such as a tackifier which contains, as abase polymer, a suitable polymer such as an acrylic polymer, a silicone polymer, polyester, polyurethane, polyether, or synthetic rubber. Especially, a material such as an acrylic tackifier excellent in optical transparency, weather resistance, and heat resistance to avoid floating or peeling under the influence of heat or humidity is preferably used.

An example of the acrylic tackifier is a tackifier containing an acrylic polymer with a weight-average molecular weight of not lower than 100,000 as a base polymer, the acrylic polymer being prepared by copolymerization of a combination of (meth)acrylic acid alkyl ester containing an alkyl group having 20 or less carbon atoms, such as a methyl group, an ethyl group, or a butyl group, and an acrylic monomer constituted by a modified component of (meth) acrylic acid, (meth) acrylic acid hydroxyethyl, or the like, with the glass transition temperature made not higher than 0° C. However, the acrylic tackifier is not limited to this example.

The polarizing member according to the invention can be used for various kinds of purposes in accordance with the related art. The polarizing member can be used particularly preferably for forming an illuminator or a liquid-crystal display device so as to achieve prevention of interference fringes, improvement of luminance, etc. The illuminator can be formed when the polarizing member 4 is disposed on a surface side (light exit side) of the planar light source 8 as shown in FIG. 1. When the polarizing member includes a reflective type polarizer, the reflective type polarizer is disposed so as to be located on the planar light source side.

Hence, in the case of the polarizing member 4 containing the reflective type polarizer using the circularly polarized light separating sheet 1 as shown in FIG. 1, the circularly polarized light separating sheet 1 is located on the planar light source side whereas the absorptive type polarizer 3 is located on the light transmission side through the quarter-wave plate 2. Although FIG. 1 shows, as an example, a planar light source constituted by a side light type light pipe 81 provided with a light source 82 disposed on a side surface of the light pipe 81, the invention may be applied also to a suitable planar light source such as a direct type planar light source. Incidentally, in the planar light source 8 shown in FIG. 1, the light source 82 is enclosed in a holder 83 and the polarizing member 4 is disposed on the light exit side of the light pipe 81 having a reflection layer 9 on its bottom surface, through a light-diffusing sheet 7 and a prism array sheet 6.

As described above, in the polarizing member using the reflective type polarizer, use of the reflected light component separated by the reflective type polarizer is advantageous in improvement of luminance. Hence, a planar light source having a reflection layer on its rear surface side can be used preferably in this case. Hence, a planar light source constituted by a side light type light pipe as shown in FIG. 1 can be used preferably from the point of view of making the reflected light component incident on the reflective type polarizer again while keeping the state of polarization of the reflected light component as much as possible in terms of utilization of the reflected light component. The invention can be usefully applied to a planar light source which uses a light source such as a fluorescent lamp made of a three band fluorescent lamp and which emits light exhibiting one emission-line peak or two or more emission-line peaks to thereby result in occurrence of interference fringes easily.

On the other hand, the liquid-crystal display device can be obtained as a structure in which the liquid-crystal cell 5 is disposed on the light exit side (surface side) of the planar light source 8 in the illuminator through the polarizing member 4 as shown in FIG. 1. The liquid-crystal display device is generally configured so that an absorptive type polarizer 41 is disposed on the visual side of the liquid-crystal cell 5 as shown in FIG. 1.

According to the liquid-crystal display device shown in FIG. 1, light emitted from the planar light source 8 is diffused by the light-diffusing sheet 7 and the optical path of the light is controlled by the prism array sheet 6. The light is made incident on the circularly polarized light separating sheet 1 of the polarizing member 4. Then, the light is separated into a reflected light component and a transmitted light component by the circularly polarized light separating sheet 1. The circularly polarized light transmitted through the circularly polarized light separating sheet 1 is made incident on the quarter-wave plate 2 and linearly polarized through the quarter-wave plate 2. The linearly polarized light passes through the absorptive type polarizer 3 in a little absorption loss state and is made incident on the liquid-crystal cell 5. As a result, display light exits from the liquid-crystal cell 5 through the visual-side absorptive type polarizer 41. On this occasion, the use of the reflected light component can improve light-utilizing efficiency to thereby improve the luminance of the liquid-crystal display device because the absorption loss due to the absorptive type polarizer 3 is little and because the reflected light component separated by the circularly polarized light separating sheet 1 is reversed by the reflection layer 9 on the lower surface side of the light pipe and made incident on the circularly polarized light separating sheet again so as to be partly or wholly transmitted through the circularly polarized light separating sheet.

Any suitable liquid-crystal cell can be used for forming the liquid-crystal display device. For example, any suitable type liquid-crystal cell such as an active matrix drive type liquid-crystal cell represented by a thin-film transistor type liquid-crystal cell, a passive matrix drive type liquid-crystal cell represented by a TN type or STN type liquid-crystal cell, or a liquid-crystal cell provided with a color filter can be used for forming various kinds of liquid-crystal display devices. When the illuminator or the liquid-crystal display device is formed, one kind of suitable optical sheet or two or more kinds of optical sheets such as a visual-side absorptive type polarizer 41, a light-diffusing sheet 7, a prism array sheet 6, and a compensating phase retarder for use in forming a liquid-crystal display device can be disposed in suitable positions as shown in FIG. 1.

As described above, the prism array layer constituted by the prism array sheet 6 is provided for controlling the optical path of light emitted from the planar light source to thereby improve directivity in a direction of the normal line (in a frontal direction) as much as possible. In the invention, one prism array layer or two or more prism array layers can be disposed between the planar light source 8 and the polarizing member 4, as shown in FIG. 1. When two or more prism array layers are disposed, it is preferable from the point of view of improvement in frontal directivity that the prism array layers are disposed so that directions of arrangement of prism arrays in adjacent upper and lower layers cross each other.

Any suitable material selected from the materials listed above in the description for the polarizing member can be used for the visual-side absorptive type polarizer 41. An anti-glare layer, an anti-reflection layer or the like may be provided as occasion demands. The anti-glare layer is provided for scattering external light reflected on the surface. The anti-reflection layer is provided for suppressing surface reflection of external light. That is, the anti-glare layer and the anti-reflection layer are provided to prevent surface-reflected light from forming glare which disturbs viewing of light transmitted through the display device. Hence, both the anti-glare layer and the anti-reflection layer may be provided to further prevent surface-reflected light from disturbing viewing.

The anti-glare layer and the anti-reflection layer are not particularly limited but can be formed as suitable ones exhibiting the aforementioned functions. Incidentally, the anti-glare layer can be formed by addition of a light scattering/reflecting fine unevenness in accordance with the light-diffusing layer. The anti-reflection layer can be formed as a multilayer coating film of inorganic oxides different in refractive index or as an interference film made of a coating film of a low-refractive-index material such as a fluorine compound, by a vapor deposition or plating method such as a sputtering method or by a suitable coating method such as a sol-gel method.

On the other hand, the phase retarder is disposed for compensating for the retardation generated by the birefringence of the liquid-crystal cell to thereby attain improvement in display quality. The compensating phase retarder is generally disposed so as to be located between the visual-side polarizer and the liquid-crystal cell and/or between the absorptive type polarizer and the liquid-crystal cell. Hence, the phase retarder may be integrally laminated onto the absorptive type polarizer of the polarizing member according to the invention. A birefringent film, an aligned liquid-crystal layer or the like as listed above in the description for the quarter-wave plate and having a suitable retardation may be used as the phase retarder. The phase retarder may be constituted by a laminate of two or more retardation layers in order to control optical characteristic such as retardation.

Respective constituent layers for forming the illuminator or the liquid-crystal display device may be simply piled up when it is preferable that the layers are not brought into close contact with one another as represented by a prism surface of a prism array layer. It is, however, preferable that constituent parts such as a polarizing member and a visual-side polarizer requiring prevention of the optical axis from being displaced are laminated and integrated with the liquid-crystal cell through adhesive layers such as tacky layers in order to stabilize quality and improve efficiency in assembling the liquid-crystal display device.

EXAMPLE 1

Only an absorptive type polarizer (SEG1425DU made by Nitto Denko Corp.) was used as a polarizing member.

EXAMPLE 2

A cyclohexanone solution containing about 25% by weight of an acrylic side-chain type cholesteric liquid-crystal polymer exhibiting liquid crystal characteristic at a temperature of 90 to 200° C. (glass transition temperature: 90° C.) was applied on a 50 $\mu$m-thick triacetyl cellulose (TAC) film provided with a rubbing-oriented film (0.1 $\mu$m thick) of polyvinyl alcohol. After the solvent was volatilized, the cholesteric liquid-crystal polymer was heated to 160° C. so that liquid crystal was aligned. Then, the liquid-crystal polymer was cooled to room temperature. In this manner, seven kinds of 3 $\mu$m-thick cholesteric liquid-crystal layers with selective reflection center wavelengths of 780 nm, 730 nm, 680 nm, 630 nm, 580 nm, 530 nm and 480 nm were formed individually. Then, the seven kinds of cholesteric liquid-crystal layers were separated from the TAC films respectively and transferred onto a cholesteric liquid-crystal layer with a selective reflection center wavelength of 780 nm through acrylic tacky layers in descending order of selective reflection center wavelength. In this manner, the seven kinds of cholesteric liquid-crystal layers were laminated successively on one another to thereby obtain a circularly polarized light separating sheet.

Then, a quarter-wave plate with a frontal retardation of 130 nm obtained by drawing a 60 $\mu$m-thick polycarbonate film was bonded onto the cholesteric liquid-crystal layer with a selective reflection center wavelength of 480 nm in the circularly polarized light separating sheet through a 25 $\mu$m-thick acrylic tacky layer. Further, an absorptive type polarizer (SEG1425DU made by Nitto Denko Corp.) was adhesively laminated onto the quarter-wave plate through an acrylic tacky layer. Thus, a polarizing member was obtained.

EXAMPLE 3

A polarizing member was obtained in the same manner as in Example 2 except that a linearly polarized light separating sheet (DBEF made by 3M Company) was adhesively laminated in place of the circularly polarized light separating sheet and the quarter-wave plate.

EXAMPLE 4

A circularly polarized light separating sheet was obtained in the same manner as in Example 2 except that seven kinds of 3 $\mu$m-thick cholesteric liquid-crystal layers were brought into close contact with one another and integrated into one body without interposition of any acrylic tacky layer by a method of applying solutions of cholesteric liquid-crystal polymers as a multilayer and aligning the multilayer as a whole, instead of the method of transferring/laminating the cholesteric liquid-crystal layers. A quarter-wave plate and an absorptive type polarizer were adhesively laminated on the circularly polarized light separating sheet to thereby obtain a polarizing member. Incidentally, in the multilayer application, layers of mixture of cholesteric liquid-crystal polymers were formed on interfaces between upper and lower layers by ventilation at room temperature (25° C.) just after the application of solutions when layers of from the second layer to the seventh layer were formed. In this manner, a layer with a selective reflection center wavelength intermediate between upper and lower layers in the seven cholesteric liquid-crystal layers was formed on the interface between the upper and lower layers on the basis of the layers of mixture.

Evaluation Test
Transmittance Difference

Figure 2:
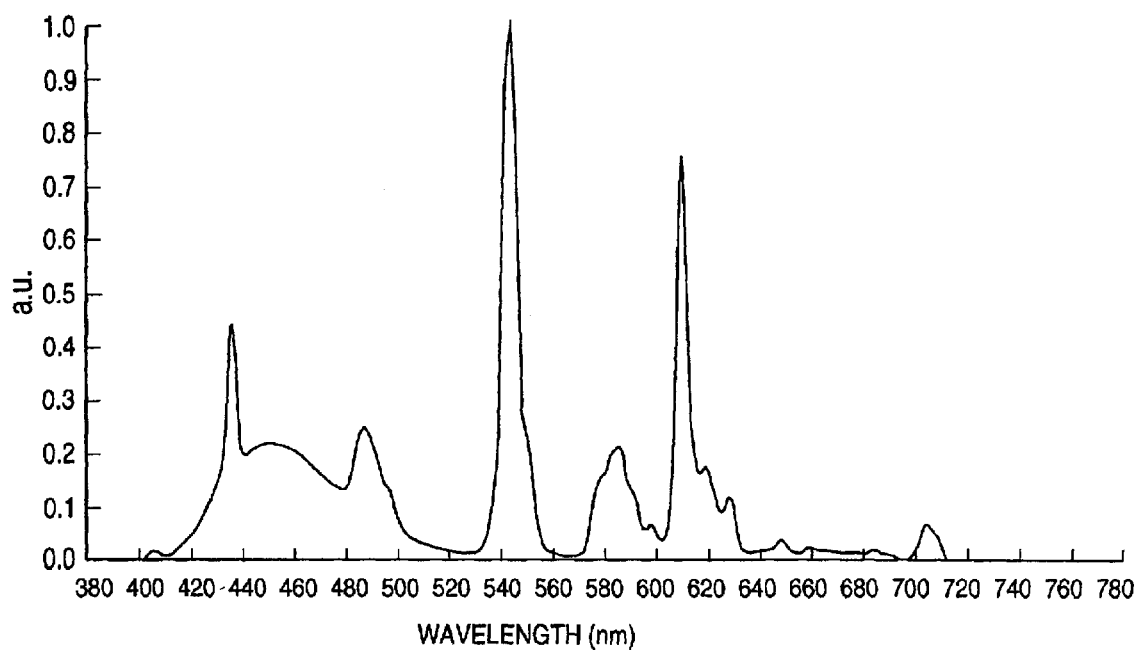
FIG. 2 is a graph showing spectral characteristic of a light source.

Light exhibiting spectral characteristic shown in FIG. 2 at an elevation angle of 50 degrees with respect to a normal line was made incident on the reflective type polarizer side of the polarizing member obtained in each of Examples 2 to 4. A transmission spectrum in a wavelength range of from 520 to 640 nm of light exiting from the absorptive type polarizer side of the polarizing member was measured by a spectrophotometer (instantaneous multi-photometric system, MCPD-2000 made by Otsuka Electronics Co., Ltd.), so that the difference between the maximum transmittance and the minimum transmittance within a 20 nm-wide wavelength region was calculated. Incidentally, in Example 1, light was made incident on one surface of the polarizer and a transmission spectrum of light exiting from the other surface of the polarizer was measured so that the difference was calculated on the transmission spectrum.

Frontal Luminance and Visibility in Oblique View

The polarizing member obtained in each of Examples 1 to 4 was disposed on a planar light source which exhibits spectral characteristic shown in FIG. 2 and which is made of a side light type light pipe having a reflection layer on its lower surface. Frontal luminance of the polarizing member was measured by a luminance meter (BM7 made by Topcon Corp.). In the condition that the view angle was changed from the front (normal line) to an elevation angle of 80 degrees, visibility in oblique view was examined on the basis of judgment as to whether discoloration occurred or not. Incidentally, discoloration for examining the visibility in oblique view was evaluated on the basis of homochromatic characteristic in the change of hue in accordance with the change of the view angle.

Results of the evaluation were as shown in the following Table.

|  | Example 1 | Example 2 | Example 3 | Example 4 |
|---|---|---|---|---|
| Transmittance Difference (%) | 2 | 9 | 12 | 3 |
| Frontal Luminance (cd/m$^2$) | 758 | 1143 | 1159 | 1155 |
| Visibility in Oblique View | Good | Bad*[1] | Bad*[1] | Good |

*[1]Interference fringes occurred.

This invention should not be limited to the embodiments described above. Various modifications can be included in this invention within a range which can be easily realized by those skilled in the art without departing from the spirit of the scope of claim.

What is claimed is:
1. A polarizing member comprising a sheet-like member formed so that linearly polarized light can be obtained as transmitted light through said sheet-like member after natural light is incident on a rear surface of said sheet-like member, wherein said sheet-like member exhibits a transmittance difference of not larger than 6% between transmitted light components within a 20 nm-wide wavelength region in a transmission spectrum of light in a wavelength range of from 520 to 640 nm when said natural light is incident on said sheet-like member at any angle ranging from an angle viewing from a line normal to a surface of said sheet-like member to an election angle of 80 degrees with respect to the line normal to the surface of said sheet-like member, said sheet-like member comprising a laminate of an absorptive type polarizer, a circularly polarized light separating sheet comprising cholesteric liquid-crystal layers in close and integral contact with one another, and a quarter wave plate.

2. A polarizing member according to claim 1, wherein layers of mixtures of cholesteric liquid-crystal polymers are formed on interfaces of cholesteric liquid-crystal layers.

3. A polarizing member according to claim 1, wherein said circularly polarized light separating sheet is obtained by applying solutions of cholesteric liquid-crystal polymers.

4. An illuminator comprising a planar light source including a reflection layer on a rear surface side of said planar light source, and a polarizing member according to claim 1 and disposed on a front surface side of said planar light source.

5. An illuminator according to claim 4, wherein said planar light source emits light while said light exhibits at least one emission-line peak.

6. An illuminator according to claim 4, further comprising at least one prism array layer disposed between said planar light source and said polarizing member.

7. An illuminator according to claim 6, wherein when said at least one prism array layer is formed by at least two prism array layers in upper and lower layers, directions of arrangement of prism arrays of said at least two prism array layers cross each other.

8. A liquid-crystal display device comprising an illuminator according to claim 4, and a liquid-crystal cell disposed on a light exit side of said illuminator through a polarizing member of said illuminator.

9. A liquid-crystal display device according to claim 8, wherein said polarizing member and said liquid-crystal cell are bonded closely to each other through an adhesive layer so as to be integrated with each other.

10. A polarizing member according to claim 1, wherein the transmittance difference is not larger than 3%.

11. A polarizing member according to claim 1, wherein the transmittance difference is not larger than 2%.

12. A polarizing member according to claim 1, wherein the cholesteric liquid-crystal layers of the circularly polarized light separating sheet are integrated into one body without interposition of adhesive layers.

* * * * *